(12) United States Patent
Lv et al.

(10) Patent No.: US 12,111,702 B2
(45) Date of Patent: Oct. 8, 2024

(54) KEYBOARD AND ELECTRONIC DEVICE WITH A GAP FOR ACCOMMODATING ADHESIVE

(71) Applicant: Huawei Technologies Co., Ltd., Shenzhen (CN)

(72) Inventors: Jing Lv, Shenzhen (CN); Tehao King, Wuhan (CN); Weijie Wu, Dongguan (CN); Bin Ye, Shenzhen (CN); Sixin Huang, Shenzhen (CN); Houxiu Zuo, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/361,337

(22) Filed: Jul. 28, 2023

(65) Prior Publication Data

US 2023/0367373 A1   Nov. 16, 2023

Related U.S. Application Data

(63) Continuation of application No. PCT/CN2022/071514, filed on Jan. 12, 2022.

(30) Foreign Application Priority Data

Jan. 30, 2021   (CN) .......................... 202110131841.6

(51) Int. Cl.
*G06F 1/16*   (2006.01)

(52) U.S. Cl.
CPC .......... *G06F 1/1662* (2013.01); *G06F 1/1616* (2013.01)

(58) Field of Classification Search
CPC .... G06F 1/1616; G06F 1/1662; G06F 1/1664; G06F 3/02; G06F 3/0202; G06F 3/0216;
(Continued)

(56) References Cited

U.S. PATENT DOCUMENTS

| 5,770,824 | A | 6/1998 | Tsai et al. | |
| 6,753,793 | B1* | 6/2004 | Kako | ..................... H01H 3/125 200/6 R |

(Continued)

FOREIGN PATENT DOCUMENTS

| CN | 2816886 Y | 9/2006 |
| CN | 201022212 Y | 2/2008 |

(Continued)

*Primary Examiner* — Keith L Crawley
(74) *Attorney, Agent, or Firm* — Slater Matsil, LLP

(57) ABSTRACT

A keyboard and an electronic device are provided. The keyboard includes a button switch, a keyboard frame, and a mechanical part. The keyboard frame includes a transverse frame and a longitudinal frame. The transverse frame extends in a row direction and is continuously disposed. The longitudinal frame extends in a column direction and is connected between two adjacent transverse frames. A plurality of longitudinal frames are arranged in a staggered manner in the column direction. The mechanical part includes a transverse support rib and a longitudinal support rib. On a side that is of the keyboard frame and that is connected to the mechanical part, the longitudinal frame protrudes relative to the transverse frame, the longitudinal frame abuts and is attached to the transverse support rib, and an adhesive-accommodating gap for accommodating adhesive is formed between the transverse frame and the transverse support rib.

20 Claims, 8 Drawing Sheets

(58) Field of Classification Search
CPC ........ G06F 3/0224; H01H 13/70–7065; H01H 13/88; F16B 11/006; B29C 65/48; B29C 65/64; B29C 65/7844; B29C 66/10–30341
See application file for complete search history.

(56) References Cited

U.S. PATENT DOCUMENTS

| | | | |
|---|---|---|---|
| 2009/0085777 A1* | 4/2009 | Chen | G06F 3/0202 341/22 |
| 2010/0117967 A1* | 5/2010 | Wang | G06F 1/1616 345/168 |
| 2014/0313656 A1* | 10/2014 | Tsao | G06F 3/0202 361/679.08 |
| 2015/0348725 A1* | 12/2015 | Tamura | B29C 66/8322 361/679.08 |
| 2017/0125188 A1* | 5/2017 | Zeng | H01H 13/14 |
| 2018/0218859 A1* | 8/2018 | Ligtenberg | H03K 17/9622 |
| 2022/0293361 A1* | 9/2022 | Wu | H01H 13/704 |

FOREIGN PATENT DOCUMENTS

| | | | |
|---|---|---|---|
| CN | 104112621 A | | 10/2014 |
| CN | 108694928 A | | 10/2018 |
| CN | 209590785 U | | 11/2019 |
| CN | 110716649 A | | 1/2020 |
| CN | 210623312 U | | 5/2020 |
| CN | 111506202 A | | 8/2020 |

* cited by examiner

KEYBOARD AND ELECTRONIC DEVICE WITH A GAP FOR ACCOMMODATING ADHESIVE

CROSS-REFERENCE TO RELATED APPLICATIONS

This application is a continuation of International Application No. PCT/CN2022/071514, filed on Jan. 12, 2022, which claims priority to Chinese Patent Application No. 202110131841.6, filed on Jan. 30, 2021. The disclosures of the aforementioned applications are hereby incorporated by reference in their entireties.

TECHNICAL FIELD

This application relates to the field of keyboard technologies, and in particular, to a keyboard and an electronic device.

BACKGROUND

Notebook computers are more popular among consumers due to small sizes, light weights, and good portability. In production and manufacturing of the notebook computer, the notebook computer is mainly made by stacking a shell, a keyboard, a mainboard, a fan, and a battery. The keyboard is attached to the notebook computer through hot melting or screw locking by using a keyboard frame attached to the shell.

In a related art, the keyboard frame may be fastened to the shell through adhesive or adhesive dispensing. When the keyboard frame is attached through the adhesive, an adhesive failure may occur, and reliability is poor. When an adhesive dispensing-based attaching solution with higher reliability is used, serious adhesive overflow may occur, that is, adhesive overflows to a surface of a mechanical part, and a worker needs to spend a lot of time and energy to remove the adhesive.

SUMMARY

Embodiments of this application provide a keyboard and an electronic device, to reduce a risk of adhesive overflow while satisfying reliability of the keyboard.

One aspect of embodiments of this application provides a keyboard, including a button switch, and a keyboard frame and a mechanical part connected through adhesive dispensing. The keyboard frame includes a transverse frame and a longitudinal frame. The transverse frame extends in a row direction and is continuously disposed. The longitudinal frame extends in a column direction and is connected between two adjacent transverse frames. A plurality of longitudinal frames are arranged in a staggered manner in the column direction. The transverse frame and the longitudinal frame cross to form a first button accommodating hole. The mechanical part includes a transverse support rib and a longitudinal support rib. The transverse support rib and the longitudinal support rib cross to form a second button accommodating hole. The first button accommodating hole and the second button accommodating hole are correspondingly provided and are jointly used to accommodate the button switch. On a side that is of the keyboard frame and that is connected to the mechanical part, the longitudinal frame protrudes relative to the transverse frame, the longitudinal frame abuts and is attached to the transverse support rib, and an adhesive-accommodating gap for accommodating adhesive is formed between the transverse frame and the transverse support rib.

According to the keyboard provided in this embodiment of this application, a mismatch between the transverse frame and the longitudinal frame on the keyboard frame is used, so that the longitudinal frame is attached to the mechanical part as a support. A gap between the transverse frame and the mechanical part forms an adhesive-accommodating structure. This can increase a volume for accommodating the adhesive, reduce a risk of adhesive overflow while satisfying a pulling force of the keyboard frame, and reduce manpower for adhesive removal on a production line.

In a possible implementation, the keyboard frame further includes an outer frame. The transverse frame and the longitudinal frame are connected in the outer frame. The mechanical part further includes an outer support rib. The transverse support rib and the longitudinal support rib are connected in the outer support rib. On the side that is of the keyboard frame and that is connected to the mechanical part, the longitudinal frame protrudes relative to the outer frame, and an adhesive-accommodating gap for accommodating adhesive is formed between the outer frame and the outer support rib.

A mismatch exists between the outer frame and the longitudinal support rib, so that the adhesive-accommodating gap used to accommodate the adhesive is formed between the outer frame and the outer support rib. This can further increase the volume for accommodating the adhesive, increase the pulling force of the keyboard frame, and reduce the risk of adhesive overflow.

In a possible implementation, an end face of a protrusion of the longitudinal frame relative to the transverse frame is aligned with an edge of the transverse frame, and surfaces of the transverse frame that are used to construct the adhesive-accommodating gap are on a same plane and have a same width.

Adhesive located in the gap between the transverse frame and the mechanical part is in a connected state in a length direction. Therefore, the adhesive with specific flowability can be distributed more evenly in the adhesive-accommodating structure. This can reduce the risk of adhesive overflow to some extent. In addition, during dispensing adhesive on the transverse support rib, a dispensing mechanism continuously dispenses the adhesive in one direction. This helps improve dispensing efficiency and dispensing uniformity.

In a possible implementation, a height of the protrusion of the longitudinal frame relative to the transverse frame falls with a range of 0.05 mm to 0.15 mm.

In a possible implementation, a width of the transverse support rib is greater than a width of the transverse frame, and a width of the longitudinal support rib is greater than a width of the longitudinal frame.

In this way, the mechanical part can shield the keyboard frame, so that a user cannot observe an interior of the keyboard frame through a gap between the button switch and the first button accommodating hole, improving appearance aesthetics. In addition, if the adhesive overflows to two sides of the transverse frame, the adhesive overflow may be attached to an edge of a lower surface of the transverse support rib, and does not overflow to an upper surface of the transverse support rib along a side surface of the transverse support rib. Therefore, manual adhesive removal is not needed.

In a possible implementation, the transverse frame and the longitudinal frame have a same width.

This facilitates processing, facilitates locating the keyboard frame and the mechanical part during press-fitting, greatly reduces a possibility of press-fitting deviation, and improves assembly precision of the keyboard frame and the mechanical part.

In a possible implementation, the width of the transverse frame and the longitudinal frame falls within a range of 1 mm to 1.5 mm.

In a possible implementation, the keyboard frame is a plastic part, and the mechanical part is a metal part.

The mechanical part may be an aluminum part or an aluminum alloy part, to provide a glossy appearance as an appearance part while enhancing overall structural strength of the keyboard.

Another aspect of embodiments of this application provides an electronic device, including the foregoing keyboard.

The electronic device may include a notebook computer, a tablet computer, a desktop computer, a virtual reality device, a vehicle-mounted apparatus, or the like. The keyboard may be an independent keyboard or integrated into the electronic device. In this case, a mechanical part of the keyboard may be directly used as a shell of the keyboard or a shell of the electronic device.

In a possible implementation, the electronic device is a notebook computer, and the notebook computer includes a first body and a second body that are connected by using a rotating shaft. A display is disposed on the first body. The keyboard and a touchpad are disposed on the second body. A mechanical part of the keyboard is a shell that is of the second body and that faces the first body.

According to the keyboard and the electronic device provided in embodiments of this application, a mismatch between the transverse frame and the longitudinal frame on the keyboard frame is used, so that the longitudinal frame is attached to the mechanical part as a support. A gap between the transverse frame and the mechanical part forms an adhesive-accommodating structure. This can increase a volume for accommodating the adhesive, reduce a risk of adhesive overflow while satisfying a pulling force of the keyboard frame, and reduce manpower for adhesive removal on a production line. In this way, overall production costs of the electronic device can be reduced and production efficiency can be improved.

DESCRIPTIONS OF REFERENCE NUMERALS

100—laptop computer; 11—first body; 111—display; 12—second body; 121—touchpad; 122—camera; 200—keyboard; 20—button switch; 21—keyboard frame; 210—outer frame; 211—transverse frame; 212—longitudinal frame; 213—first button accommodating hole; 214—end face; 22—mechanical part; 220—outer support rib; 221—transverse support rib; 222—longitudinal support rib; 223—second button accommodating hole.

DETAILED DESCRIPTION OF ILLUSTRATIVE EMBODIMENTS

Figure 1:
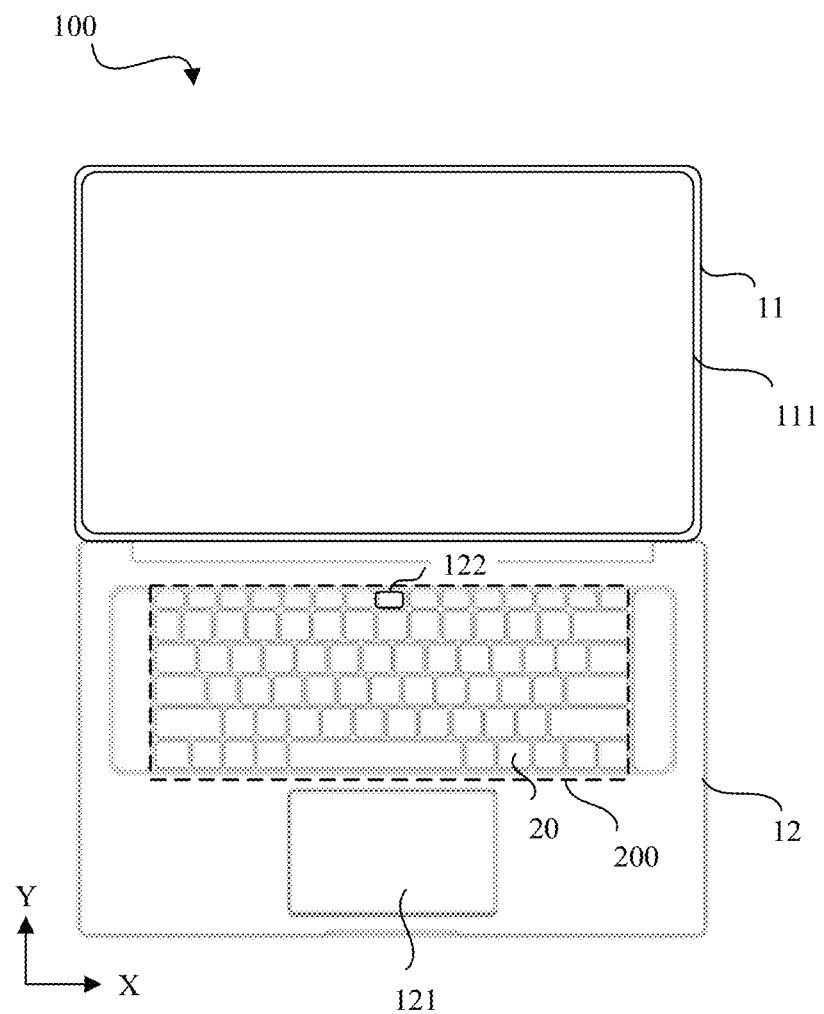
FIG. 1 is a schematic diagram of a structure of a notebook computer according to an embodiment of this application.

FIG. 1 is a schematic diagram of a structure of a notebook computer according to an embodiment of this application. Refer to FIG. 1. An embodiment of this application provides the notebook computer 100, including a first body 11 and a second body 12. Parts such as a display 11 may be disposed on the first body 11. Parts such as a keyboard 200, a touchpad 121, a camera 122, a mainboard, a battery, and a heat dissipation fan (not shown in the figure) may be disposed on the second body 12.

The first body 11 may be rotatably connected to the second body 12 by using an apparatus such as a rotating shaft or a hinge, so that the first body 11 and the second body 12 may rotate relative to each other, to facilitate a user to adjust an opening angle of the notebook computer. FIG. 1 is a schematic diagram of rotating the first body 11 and the second body 12 to an expanded state. When the first body 11 and the second body 12 rotate to be attached to each other, the notebook computer 100 is reduced in size, and is easy to store and carry.

The user may interact with the notebook computer 100 by tapping the keyboard 200. The keyboard 200 occupies most space of the second body 12. As a main input device, a factor such as structural reliability and assembly precision of the keyboard 200 has a relatively large impact on overall performance of the notebook computer 100.

The keyboard 200 may include a plurality of button switches 20 arranged in an array. The plurality of button switches 20 correspond to different inputs, for example, 26 English letters, 10 Arabic numerals, Start, space, Enter, Tab, and Delete. The plurality of button switches 20 are connected to the mainboard. The user may tap the button switches 20 to implement a plurality of input functions. The camera 122 may be integrated on one button in the keyboard 200, and is used as an elevator camera to implement an image shooting function.

The keyboard 200 may further include a keyboard frame. The keyboard frame may be fastened to the second body 12 through hot melting or screw locking. A plurality of button accommodating holes are provided on the keyboard frame to accommodate the plurality of button switches 20 and do not interfere with moving down and rebounding of the button switches 20. The keyboard frame may be fastened to the mechanical part through adhesive or adhesive dispensing, and the mechanical part may be a part of a shell of the second body 12.

When the mechanical part is attached to the keyboard frame through adhesive, an adhesive failure may occur, and reliability is poor. When an adhesive dispensing-based attaching solution with higher reliability is used, serious adhesive overflow may occur, that is, adhesive overflows to a surface of the shell, and a worker needs to spend a lot of time and energy to remove the adhesive. In addition, after the residual adhesive is manually removed, an insufficient adhesive amount lowers a pulling force that the keyboard frame can bear. This affects overall quality of the keyboard 200 and the notebook computer 100.

To relieve the overflow problem and ensure connection reliability, in a related art, the solution of disposing an adhesive overflow groove or an adhesive blocking wall on the keyboard frame is used.

Figure 2:
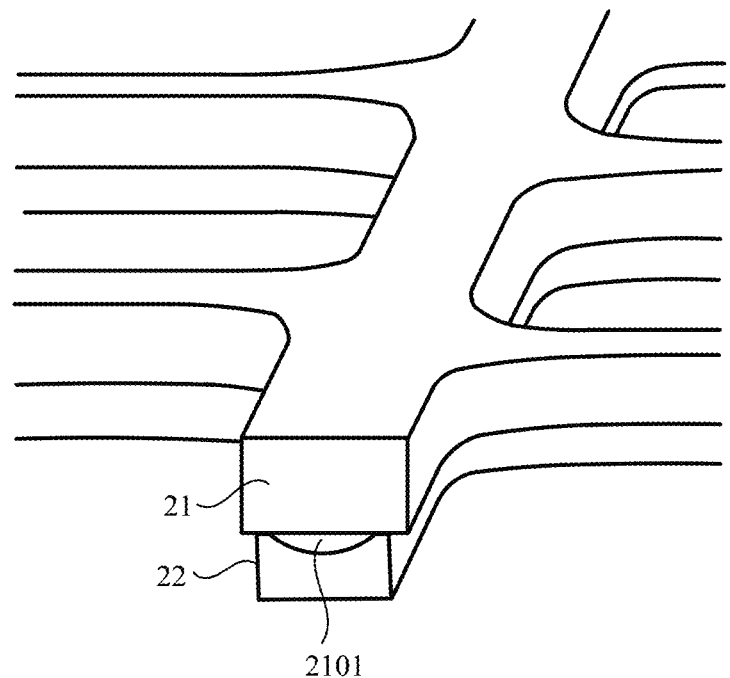
FIG. 2 is a partial cross-sectional view of a keyboard according to a related art.

FIG. 2 is a partial cross-sectional view of a keyboard according to a related art. As shown in FIG. 2, in the related art, there is a narrow side between two adjacent button accommodating holes on a keyboard frame 21. An arc-shaped adhesive overflow groove 2101 is disposed on the narrow side. The arc-shaped adhesive overflow groove 2101 is located on a side that is of the keyboard frame 21 and that is attached to a mechanical part 22. After an adhesive dispensing device is used to dispense adhesive on the mechanical part 22, the keyboard frame 21 is attached to the mechanical part 22 under action of a press-fitting jig. The adhesive may be limited in the arc-shaped adhesive overflow groove 2101. The arc-shaped adhesive overflow groove 2101 increases space for adhesive overflow, reducing the adhesive overflow.

In the solution provided in the related art, the keyboard frame 21 and the mechanical part 22 are bonded through adhesive dispensing. The arc-shaped adhesive overflow groove 2101 can increase space for accommodating the adhesive to some extent, improve adhesion reliability, and reduce adhesive overflow to some extent. However, when the keyboard frame 21 and the mechanical part 22 are press-fitted, deviation may occur. The narrow side of the keyboard frame 21 has a limited width, and the arc-shaped adhesive overflow groove 2101 has limited space. Therefore, a large proportion of adhesive overflow still occurs in the keyboard frame 21, and manual adhesive removal is needed. In addition, when the adhesive overflows outside the arc-shaped adhesive overflow groove 2101, the keyboard frame 21 and the mechanical part 22 may not be properly attached due to existence of the adhesive overflow at a position where the keyboard frame 21 and the mechanical part 22 are originally closely attached. This affects assembly precision and appearance aesthetics of the entire keyboard 200.

Figure 3:
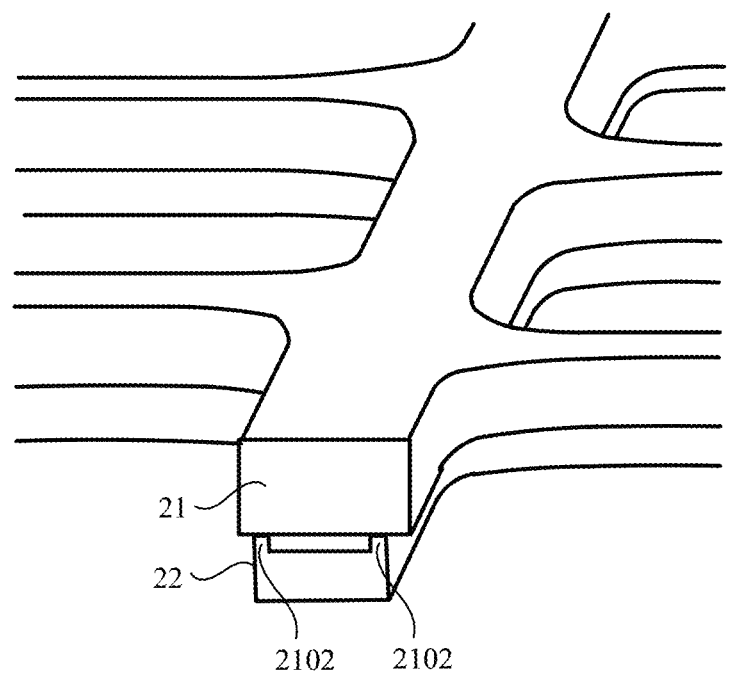
FIG. 3 is a partial cross-sectional view of a keyboard according to another related art.

FIG. 3 is a partial cross-sectional view of a keyboard according to another related art. Refer to FIG. 3. In another related art, there is a narrow side between two adjacent button accommodating holes on a keyboard frame 21, and an adhesive blocking wall 2102 is disposed on the narrow side. One adhesive blocking wall 2102 is disposed on each of two sides of the narrow side, and adhesive blocking walls 2102 on the two sides and the narrow side form a U-shaped groove. After an adhesive dispensing device is used to dispense adhesive on a mechanical part 22, the keyboard frame 21 is attached to the mechanical part 22 under action of a press-fitting jig. An end of the adhesive blocking wall 2102 is closely attached to the mechanical part 22, and the adhesive may be limited in the U-shaped groove.

Compared with an arc-shaped adhesive overflow groove 2101, the U-shaped groove surrounded by the adhesive blocking wall 2102 has larger space for adhesive overflow, and can further reduce the adhesive overflow. However, a size of the narrow side of the keyboard frame 21 is relatively small, and the adhesive blocking wall 2102 is extremely narrow. Therefore, a burr is likely generated during molding, and adhesion may be unreliable due to insufficient adhesive filling. In addition, when the keyboard frame 21 is assembled, a specific proportion of adhesive overflow may occur, and manual adhesive removal is needed.

It can be learned from the foregoing two related arts that, to avoid a phenomenon of adhesive overflow, a common idea is to dispose a blocking part on two sides of space for filling the adhesive to avoid the adhesive overflow. However, it is found through research that, when the blocking part is used to avoid the adhesive overflow, the adhesive overflow is still likely to occur when the keyboard frame 21 and the mechanical part 22 are bonded through adhesive dispensing. Manual adhesive removal has a difficulty and needs a relatively large quantity of manpower in a production line, resulting in low production efficiency and high costs. In addition, after the residual adhesive is manually removed, an insufficient adhesive amount lowers a pulling force that the keyboard frame can bear.

It is found through research that, a reason for generating the phenomenon may include: an amount of adhesive filling affects reliability of the keyboard frame and the mechanical part. Therefore, to ensure the reliability of the keyboard frame and the mechanical part, the amount of adhesive filling needs to reach a specific amount, and usually exceeds an amount that can be accommodated by an adhesive filling area in FIG. 2 and FIG. 3. In this case, adhesive overflow may occur.

Based on the foregoing problem, embodiments of this application provide a keyboard and an electronic device. A mismatch between the transverse frame and the longitudinal frame on the keyboard frame is used, so that the longitudinal frame is attached to the mechanical part as a support. A gap between the transverse frame and the mechanical part forms an adhesive-accommodating structure. This can increase a volume for accommodating the adhesive, reduce a risk of adhesive overflow while satisfying a pulling force of the keyboard frame, and reduce manpower for adhesive removal on a production line.

The following specifically describes a structure of the keyboard provided in this application with reference to the accompanying drawings and specific embodiments.

Figure 4:
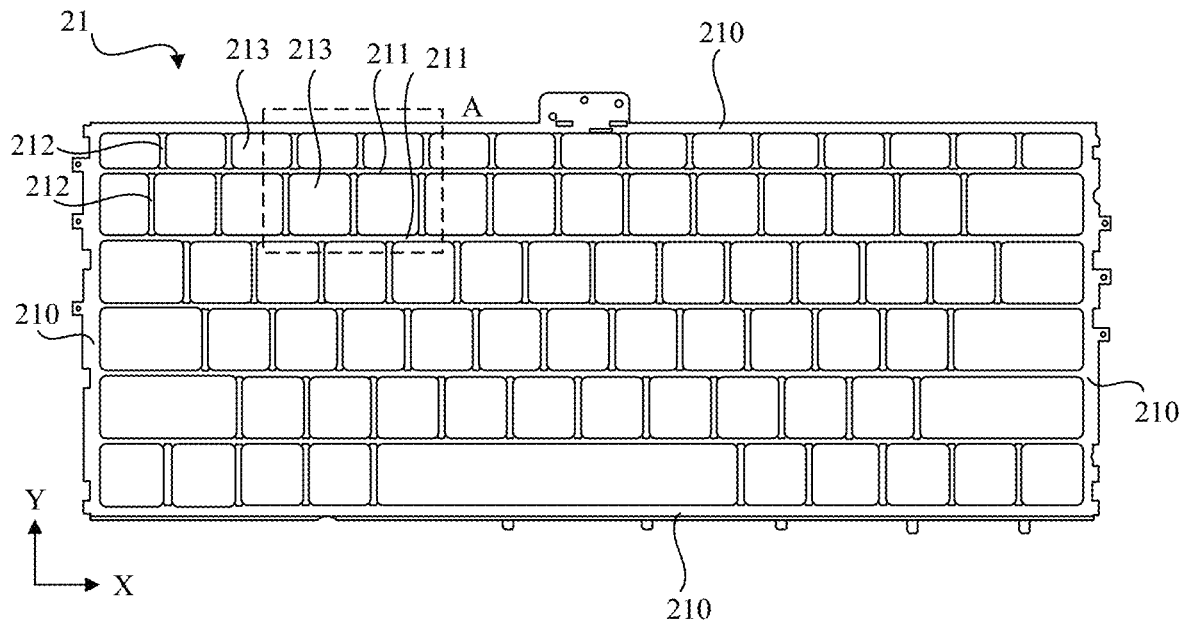
FIG. 4 is a schematic diagram of a structure of a keyboard frame according to an embodiment of this application.
Figure 5:
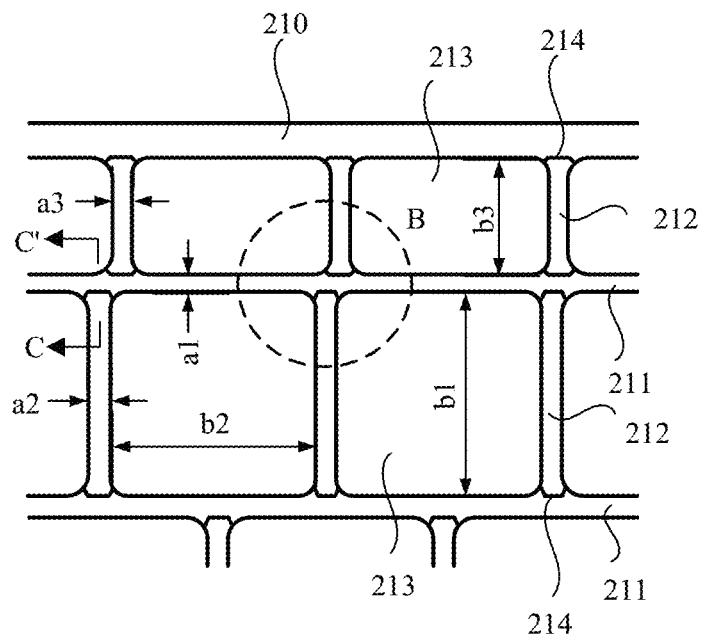
FIG. 5 is an enlarged view of A in FIG. 4.
Figure 6:
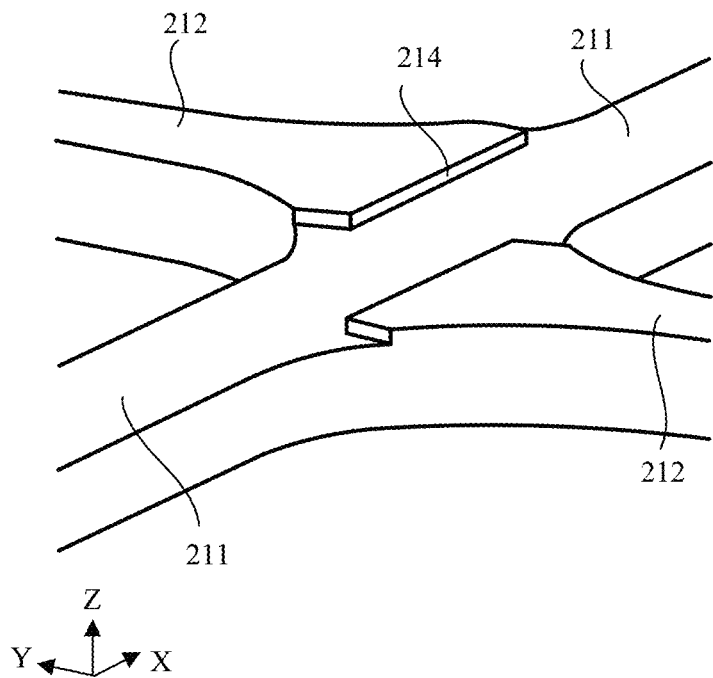
FIG. 6 is a three-dimensional diagram corresponding to B in FIG. 5.

FIG. 4 is a schematic diagram of a structure of a keyboard frame according to an embodiment of this application. FIG. 5 is an enlarged view of A in FIG. 4. Refer to FIG. 4 to FIG. 6. A keyboard frame 21 provided in this embodiment of this application may include an outer frame 210, and a transverse frame 211 and a longitudinal frame 212 that are disposed in the outer frame 210. The transverse frame 211 extends in a direction X shown in the figure, that is, a length direction of the keyboard 200. The longitudinal frame 212 extends in a direction Y shown in the figure, that is, a width direction of the keyboard 200. The transverse frame 211 and the longitudinal frame 212 are disposed in a cross manner, to form a plurality of first button accommodating holes 213 for accommodating button switches 20.

The plurality of button switches 20 of the keyboard 200 have different sizes. In addition, considering a factor such as an input speed, the plurality of button switches 20 may be aligned in a row direction, and may be not aligned in a column direction, that is, may be arranged in a staggered manner. This is a structural feature of the keyboard 200.

Correspondingly, in this embodiment of this application, the transverse frame 211 is connected between a left frame and a right frame of the outer frame 210 that are oppositely disposed. Each transverse frame 211 is continuously disposed. A plurality of transverse frames 211 are disposed in parallel to divide the keyboard frame 21 into several rows. The longitudinal frame 212 is connected between two adjacent rows of transverse frames 211, or between an upper frame of the outer frame 210 and an adjacent transverse frame 211, or between a lower frame of the outer frame 210 and an adjacent transverse frame 211. A plurality of longitudinal frames 212 are disposed in parallel, but longitudinal frames 212 in two adjacent rows may be not aligned but arranged in a staggered manner. Correspondingly, it is not difficult to understand that the first button accommodating holes 213 are aligned in rows in a transverse direction, and may be arranged in a staggered manner in a longitudinal direction.

Figure 7:
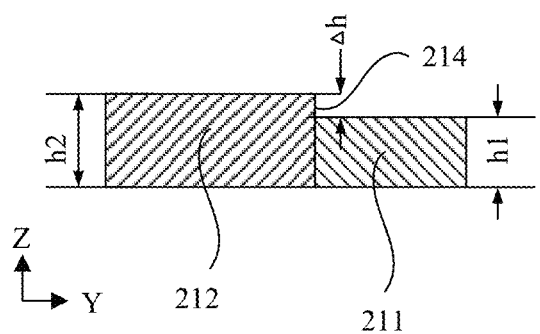
FIG. 7 is a cross-sectional view corresponding to C-C' in FIG. 5.

FIG. 6 is a three-dimensional diagram corresponding to B in FIG. 5. FIG. 7 is a sectional view corresponding to C-C' in FIG. 5. Refer to FIG. 6 and FIG. 7. Surfaces of the transverse frames 211 are on a same horizontal plane. A surface of the longitudinal frame 212 protrudes relative to the transverse frame 211, and an end face 214 of a protrusion is aligned with an edge of the transverse frame 211. It can be learned with reference to FIG. 4 and FIG. 5 that, optionally, the longitudinal frame 212 may protrude relative to the outer frame 210, and an end face on a side that is of a protrusion and that is close to the outer frame 210 is aligned with an edge of the outer frame 210. At least a part of a surface of the outer frame 210 and a surface of the transverse frame 211 may be located on a same horizontal plane.

A thickness h1 of the transverse frame 211 is less than a thickness h2 of the longitudinal frame 212, and a height of the protrusion of the longitudinal frame 212 relative to the transverse frame 211 is Δh, that is, a height of the end face 214. In a specific implementation, the thickness h1 of the transverse frame may fall within a range of 0.5 mm to 0.7 mm, for example, may be 0.6 mm. The thickness of the longitudinal frame 212 may fall within a range of 0.6 mm to 0.8 mm, for example, may be 0.7 mm. Δh may fall within a range of 0.05 mm to 0.15 mm, for example, may be set to 0.1 mm.

Figure 8:
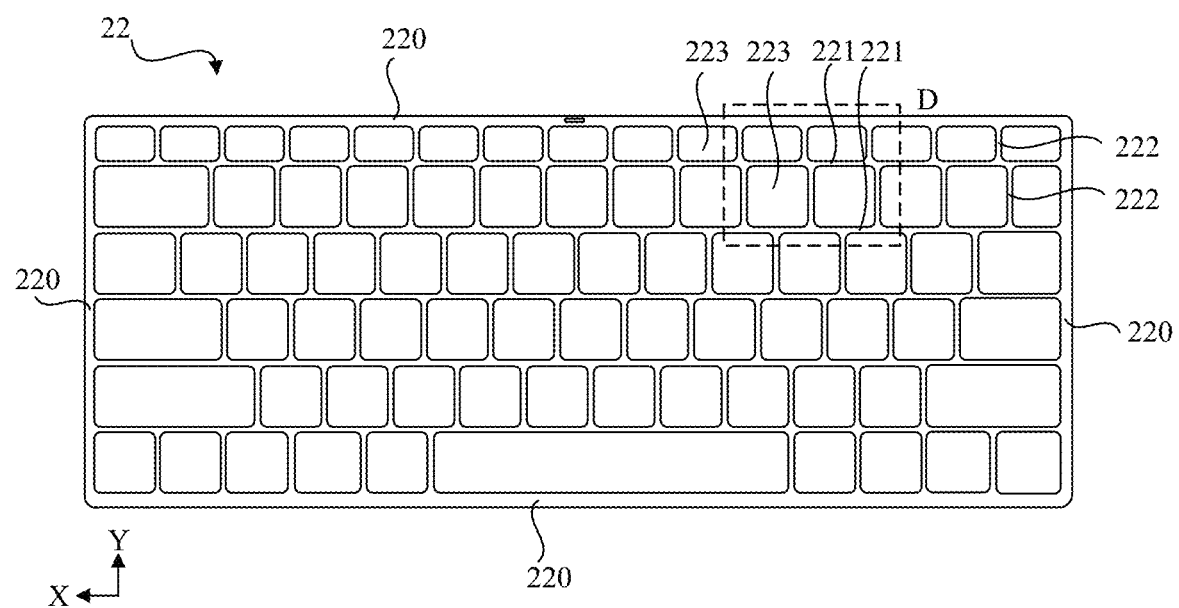
FIG. 8 is a schematic diagram of a structure of a mechanical part according to an embodiment of this application.
Figure 9:
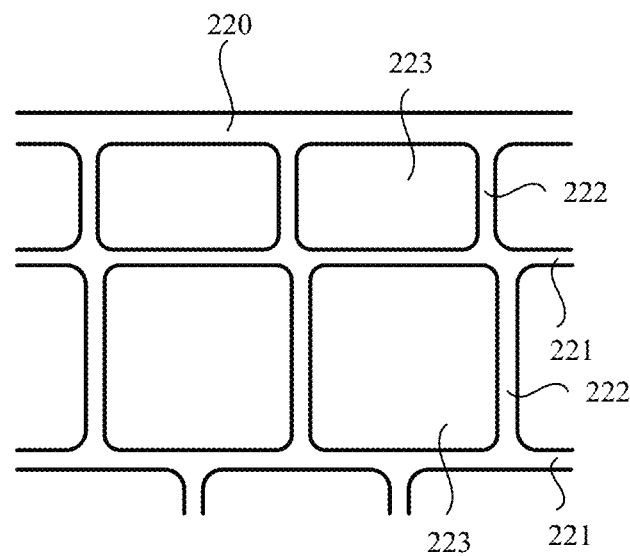
FIG. 9 is an enlarged view of D in FIG. 8.

FIG. 8 is a schematic diagram of a structure of a mechanical part according to an embodiment of this application. FIG. 9 is an enlarged view of D in FIG. 8. Refer to FIG. 8 and FIG. 9. The mechanical part 22 provided in this embodiment of this application may include an outer support rib 220, and a transverse support rib 221 and a longitudinal support rib 222 that are disposed in the outer support rib 220. The transverse support rib 221 extends in a direction X shown in the figure, that is, a length direction of a keyboard 200. The longitudinal support rib 222 extends in a direction Y shown in the figure, that is, a width direction of the keyboard 200. The transverse support rib 221 and the longitudinal support rib 222 cross in a staggered manner, to limit a plurality of second button accommodating holes 213 for accommodating button switches 20.

Surfaces on both sides of the mechanical part 22 may be disposed as aligned surfaces, and an overall thickness of the mechanical part 22 is even, and may fall within a range of 0.7 mm to 0.9 mm, for example, may be 0.8 mm. The mechanical part 22 is connected to a keyboard frame 21. An outer frame 210 is correspondingly connected to the outer support rib 220. A transverse frame 211 is correspondingly connected to the transverse support rib 221. A longitudinal frame 212 is correspondingly connected to the longitudinal support rib 222. A first button accommodating hole 213 and the second button accommodating hole 223 are correspondingly provided to accommodate the button switch 20.

The mechanical part 22 may serve as an upper surface shell of a second body 12 of a notebook computer 100. It should be noted that FIG. 8 shows a structure of the mechanical part 22 corresponding to the keyboard frame 21, and the mechanical part 22 may be a part of the upper surface shell of the second body 12. The mechanical part 22 may be made of metal such as aluminum and aluminum-magnesium alloy, to enhance overall structural strength of the keyboard 200 and provide a glossy appearance.

In addition, the first button accommodating hole 213 and the second button accommodating hole 223 may be in a rounded rectangle, that is, a connection between the transverse frame 211 and the longitudinal frame 212 is a rounded corner, and a connection between the transverse support rib 221 and the longitudinal support rib 222 is a rounded corner, so that stress concentration does not occur at the connection between the transverse frame 211 and the longitudinal frame 212 and the connection between the transverse support rib 221 and the longitudinal support rib 222. This helps improve overall structural strength and appearance aesthetics of the keyboard 200. A rounded corner of the rounded rectangle is not specifically limited in size in this embodiment of this application.

Figure 10:
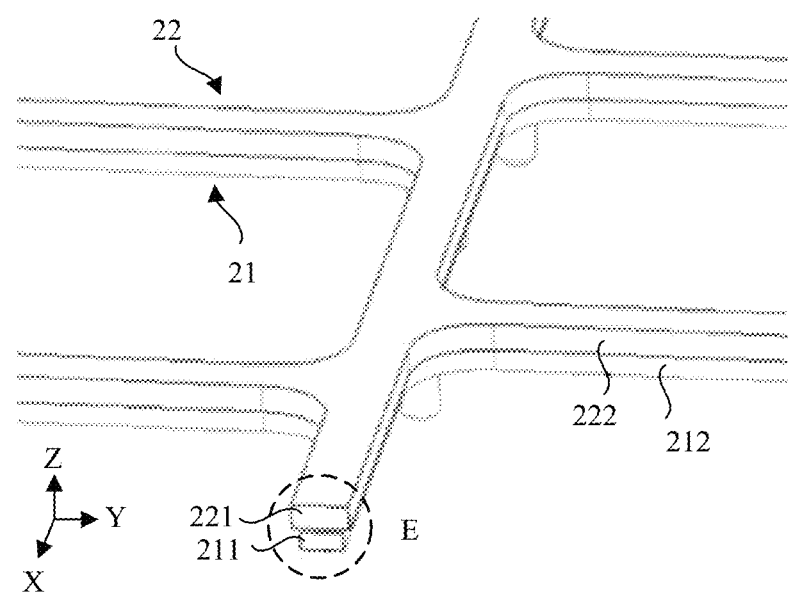
FIG. 10 is a partial cross-sectional view of a keyboard frame and a mechanical part that are assembled according to an embodiment of this application.
Figure 11:
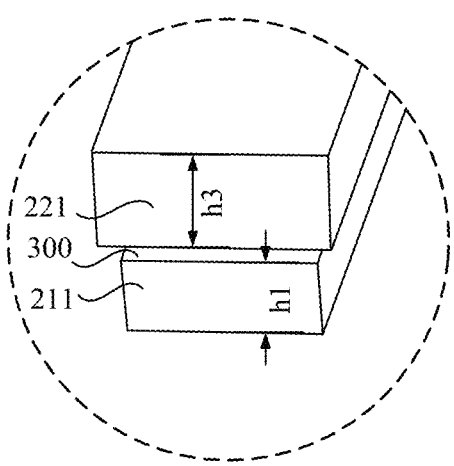
FIG. 11 is an enlarged view of E in FIG. 10.

FIG. 10 is a partial cross-sectional view of a keyboard frame and a mechanical part that are assembled according to an embodiment of this application. FIG. 11 is an enlarged view of E in FIG. 10. Refer to FIG. 10 and FIG. 11. The keyboard frame 21 is under the mechanical part 22. An upper surface (the surface shown in FIG. 4) of the keyboard frame 21 and a lower surface (the surface shown in FIG. 8) of the mechanical part 22 are connected by using AB adhesive. The AB adhesive is two-component acrylate adhesive, including components A and B mixed at a ratio of 10:1. The component A includes an acrylate monomer, a toughening agent, a reducing agent, a stabilizer, a rheological aid, and the like. The component B includes a peroxidant, a plasticizer, a rheological aid, and the like.

A longitudinal frame 212 on the keyboard frame 21 protrudes relative to a transverse frame 211. Therefore, after the keyboard frame 21 and the mechanical part 22 are press-fitted, the longitudinal frame 212 is closely attached to a longitudinal support rib 222, and an adhesive-accommodating gap 300 may be formed between a transverse frame 211 and a transverse support rib 221. Optionally, an adhesive-accommodating gap may also be formed between an outer frame 210 and an outer support rib 220.

The solution in this embodiment of this application breaks a conventional idea that a blocking part needs to be disposed on both sides of an adhesive filling area, does not dispose a blocking part, and forms an adhesive-accommodating gap by using a mismatch between the transverse frame 211 and the transverse support rib 221. Because the blocking part is not disposed, the adhesive-accommodating gap is increased. This can reduce or avoid a risk of adhesive overflow caused by insufficient adhesive-accommodating space when the keyboard frame and the structural frame are press-fitted.

An assembly process of the keyboard frame 21 and the mechanical part 22 may be as follows: first, fasten the mechanical part 22 to a jig, and use an adhesive dispensing device to evenly dispense adhesive on the outer support rib 220 and the transverse support rib 221 of the mechanical part 22; after dispensing is completed, measure an adhesive weight, and check whether adhesive breakage occurs, ensuring a dispensing status satisfying a standard; and press-fit the keyboard frame 21 and the mechanical part 22 on the jig through a hot-pressing process, so that the AB adhesive is evenly distributed in the adhesive-accommodating gap 300 formed between the outer frame 210 and the outer support rib 220 and between the transverse frame 211 and the transverse support rib 221, and the mechanical part 22 and the keyboard frame 21 are bonded.

Figure 12:
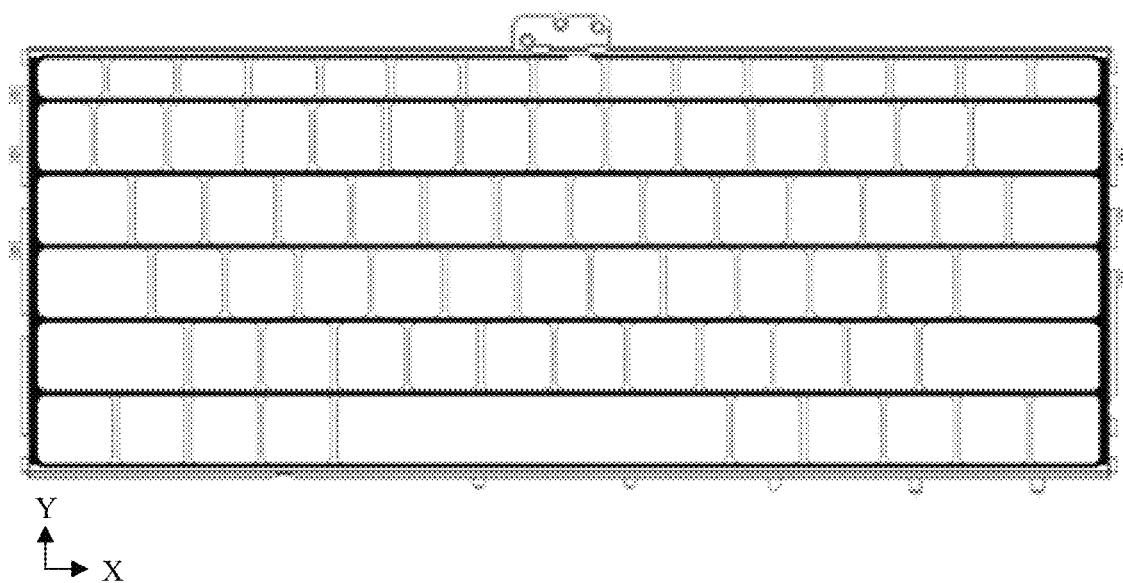
FIG. 12 is a schematic diagram of an adhesive-accommodating area on a keyboard frame according to an embodiment of this application.

FIG. 12 is a schematic diagram of an adhesive-accommodating area on a keyboard frame according to an embodiment of this application, where a black filling area is an area covered by AB adhesive. Refer to FIG. 12. An adhesive-accommodating gap 300 may be formed between a transverse frame 211 and a transverse support rib 221, and an adhesive-accommodating gap may also be formed between an outer frame 210 and an outer support rib 220. A maximum adhesive-accommodating area on the keyboard frame 21 is shown in FIG. 12. The AB adhesive may cover a total area of the outer frame 210 and the transverse frame 211 on the keyboard frame 21.

It should be noted that the outer frame 210 is a main frame disposed around the transverse frame 211 and a longitudinal frame 212, and includes an upper frame, a right frame, a lower frame, and a left frame that are successively connected. A hanger may be disposed on an outer side of each of the left frame and the right frame, and is configured to connect the keyboard frame 21 to a structure such as a speaker on two sides of the keyboard frame 21. A mounting table for mounting a camera 122 may be disposed on an outer side of the upper frame, and a cable arrangement structure may be disposed on an outer side of the lower frame. It is not difficult to understand that a maximum coverage area of the AB adhesive includes the main frame of the outer frame 210, and may not include the hanger, the mounting table, or the cable arrangement structure.

Figure 13:
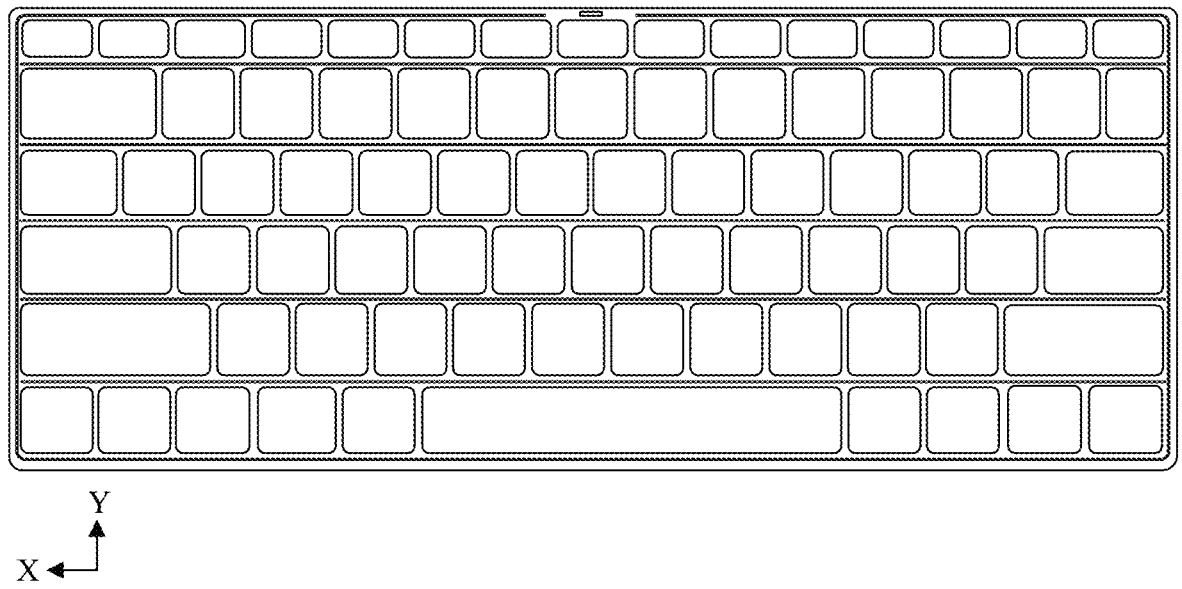
FIG. 13 is a schematic diagram of adhesive dispensing on a mechanical part according to an embodiment of this application.

FIG. 13 is a schematic diagram of adhesive dispensing on a mechanical part according to an embodiment of this application. In the figure, dark thick lines on a transverse support rib and an outer support rib are AB adhesive. Refer to FIG. 13. In an actual processing process, after adhesive is dispensed on the mechanical part 22, a coverage width of adhesive dispensing is less than a width of a transverse support rib and a width of an outer support rib, and the AB adhesive is located in the middle of the transverse support rib. After a keyboard frame 21 and the mechanical part 22 are press-fitted, a proportion of AB adhesive overflow is greatly reduced.

According to the keyboard provided in this embodiment of this application, a mismatch between a transverse frame 211 and a longitudinal frame 212 on the keyboard frame 21 is used, so that when the keyboard frame 21 is bonded to the mechanical part 22, the longitudinal frame 212 protruding relative to the transverse frame 211 may be closely attached to the mechanical part 22 as a support, and a gap between the transverse frame 211 and the mechanical part 22 forms an adhesive-accommodating structure. Theoretically, this can increase adhesive-accommodating space, improve adhesion strength, and reduce a risk of adhesive overflow.

Compared with the keyboards provided in the related arts shown in FIG. 2 and FIG. 3, in this embodiment of this application, two sides of the transverse frame 211 are open structures, and no adhesive overflow groove or adhesive blocking wall is disposed. A gap between the transverse frame 211 and the transverse support rib 221 is used as an adhesive-accommodating structure. The adhesive-accommodating structure has a larger volume. In the case of a same adhesive amount, a proportion of adhesive overflow is greatly reduced in the solution provided in this embodiment of this application.

As shown in FIG. 12, a maximum amount of adhesive accommodated in the adhesive-accommodating structure depends on a coverage area of the AB adhesive on the keyboard frame 21 and a height of an adhesive-accommodating gap 200. The coverage area of the AB adhesive on the keyboard frame 21 is equal to a length of the transverse frame 211 multiplied by a width of the transverse frame 211, plus an area of an outer frame 210. The height of the adhesive-accommodating gap 300 is a mismatch Δh between the transverse frame 211 and the longitudinal frame 212. For keyboards 200 of different models, the foregoing values may be fine-tuned, to control the maximum amount of adhesive accommodated in the adhesive-accommodating structure of the keyboard 200, so that a pulling force of the keyboard frame 21 satisfies a preset pulling force standard in a test.

In addition, it should be noted that, in addition to the maximum amount of adhesive accommodated in the adhesive-accommodating structure, there is a factor that affects a risk of adhesive overflow and a test result of the pulling force. During a dispensing process, a parameter such as a pressure, an extrusion speed, a dispensing speed, an adhesive weight, and a dispensing needle diameter of an adhesive dispensing device is controlled, to ensure that the AB adhesive is evenly and accommodated in the adhesive-accommodating structure, further reducing the risk of adhesive overflow.

In a specific embodiment, an overall length of the keyboard frame 21 may fall within a range of 260 mm to 300 mm, for example, may be 282 mm. An overall width of the keyboard frame 21 may fall within a range of 100 mm to 120 mm, for example, may be 112 mm. A weight of adhesive dispensed between the keyboard frame 21 and the mechanical part 22 may fall within a range of 0.205 g to 0.403 g.

A width a1 of the transverse frame 211 may be between 1 mm and 1.5 mm, for example, may be 1.25 mm. A width a2 of the longitudinal frame 212 may be between 1 mm and 1.5 mm, for example, may be 1.25 mm. A width a3 of the longitudinal frame 212 located between an upper frame of the outer frame 210 and an adjacent transverse frame 211 may be between 1 mm and 1.6 mm, for example, may be 1.46 mm. A distance b1 between two adjacent transverse frames 211 may be between 16 mm and 20 mm, for example, may be 17.80 mm. A distance b2 between two adjacent longitudinal frames 212 may be between 16 mm and 20 mm, for example, may be 17.80 mm. A distance b3 between the upper frame of the outer frame 210 and the adjacent transverse frame 211 is less than b1, and may be between 9 mm and 12 mm, for example, may be 10.14 mm. A width of the outer frame 210 is not less than the width of the transverse frame 211, and may fall within a range of 1 mm to 1.5 mm. A rounded corner size of a first button accommodating hole 213 may be between 2 mm and 3 mm, for example, may be set to 2.30 mm.

A thickness h3 of a transverse support rib 221, that is, an overall thickness of the mechanical part 22, may fall within a range of 0.7 mm to 0.9 mm, for example, may be 0.8 mm. The height of the adhesive-accommodating gap 300, that is, a height Δh of a protrusion of the longitudinal frame 212 relative to the transverse frame 211, may fall within a range of 0.05 mm to 0.15 mm, for example, may be set to 0.1 mm.

It should be noted herein that values and value ranges in this application are approximate values. Due to impact of a manufacturing process, there may be an error in a specific range. A person skilled in the art may consider that the error is negligible.

Figure 14:
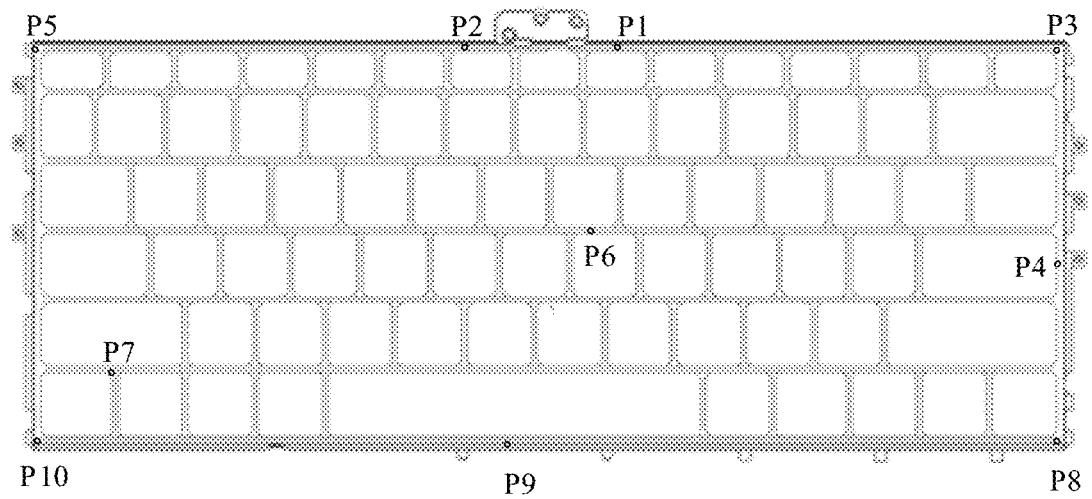
FIG. 14 is a schematic diagram of selecting a point for a pulling force test on a keyboard frame according to an embodiment of this application.

FIG. 14 is a schematic diagram of selecting a point for a pulling force test on a keyboard frame according to an embodiment of this application. Refer to FIG. 14. For the keyboard 200 provided in the foregoing specific embodiment, a pulling force test standard that needs to be satisfied by each point on the keyboard frame 21 is 5 Kg. As shown in FIG. 13, pulling force test points P1 to P10 are used. P1 to P10 may be distributed at a plurality of typical positions or weak positions with a relatively small amount of adhesive, such as four corners, the middle, and a middle part of an outer frame of the keyboard frame 21. A weight of adhesive filled in the test is 0.205 g to 0.403 g, and a volume of the adhesive is less than a maximum volume of an adhesive-accommodating gap. In an actual pulling force test, products of different batches are tested. A test result is shown in Table 1. Pulling force data in a unit of Kg is obtained after 1 to 10 tests are performed on P1 to P10, and all test data of the pulling force exceeds a preset standard 5 Kg. Therefore, the test result proves that a pulling force at any position of P1 to P10 satisfies the preset standard. It can be learned that, according to the solution of this application, the adhesive-accommodating gap is increased, and an amount of adhesive accommodated in the adhesive-accommodating gap can satisfy a reliability requirement between the keyboard frame and the mechanical part.

TABLE 1

| No. | P1 | P2 | P3 | P4 | P5 | P6 | P7 | P8 | P9 | P10 |
| --- | --- | --- | --- | --- | --- | --- | --- | --- | --- | --- |
| 1 | 11.9 | 9.8 | 12 | 8.6 | 5.2 | 13.8 | 6.3 | 8.2 | 6.7 | 9.6 |
| 2 | 12.3 | 7.7 | 10.7 | 8.3 | 5.3 | 10.6 | 5.7 | 8 | 10.5 | 6.5 |
| 3 | 8.4 | 9.6 | 14.3 | 8.7 | 6.6 | 7.4 | 9.4 | 9.8 | 7.2 | 10.5 |
| 4 | 7.3 | 11.1 | 11 | 9.6 | 6 | 5.4 | 5.8 | 7.7 | 10.5 | 11.1 |
| 5 | 10.7 | 8.2 | 11.5 | 6.8 | 14.2 | 14.1 | 7 | 7.9 | 10.3 | 8.2 |
| 6 | 7.7 | 7.9 | 12 | 11.9 | 5.6 | 13.9 | 7.4 | 8.1 | 8.5 | 8.3 |
| 7 | 8.4 | 9.3 | 10.8 | 10.1 | 5.1 | 5.9 | 6.2 | 10.2 | 5.4 | 10.1 |
| 8 | 12 | 14 | 15.9 | 11.1 | 5.3 | 6.2 | 11.1 | 8 | 8.2 | 6.8 |
| 9 | 8.4 | 10.7 | 10.2 | 8.9 | 14.1 | 12.5 | 7.3 | 8.9 | 7.1 | 7.1 |
| 10 | 12.4 | 12.3 | 8.9 | 8.3 | 9.1 | 10.4 | 6.9 | 9.3 | 11.6 | 8.7 |

With reference to an actual test result, it can be proved that in the solution provided in this embodiment of this application, a mismatch between a transverse frame 211 and a longitudinal frame 212 on the keyboard frame 21 is used, so that a gap between the transverse frame 211 and the mechanical part 22 forms an adhesive-accommodating structure. In this way, a pulling force test standard of the keyboard frame 21 can be satisfied. In other words, an adhesion reliability requirement of the keyboard 200 is satisfied.

In the foregoing embodiment of this application, for the keyboard frame 21, a width a1 of the transverse frame 211 may be the same as a width a2 of the longitudinal frame 212, so that two adjacent first button accommodating holes 213 have a same transverse distance and a same longitudinal distance. This facilitates processing. Alternatively, a width a1 of the transverse frame 211 may be greater than a width a2 of the longitudinal frame 212. Widening of the transverse frame 211 helps increase a volume of adhesive accommodated at the transverse frame 211. For example, a difference between the width a1 of the transverse frame 211 and the width a2 of the longitudinal frame 212 is not greater than 0.2 mm.

For the mechanical part 22, in a possible implementation, a width of a transverse support rib 221 may be slightly greater than the width of the transverse frame 211, and a width of the longitudinal support rib 222 may be slightly greater than the width of the longitudinal frame 212. In this case, an area of a second button accommodating hole 223 is less than an area of the first button accommodating hole 213. For example, a difference between the width of the transverse support rib 221 and the width of the transverse frame 211 is not greater than 0.2 mm, and a difference between the width of the longitudinal support rib 222 and the width of the longitudinal frame 212 is not greater than 0.2 mm. In this way, the mechanical part 22 can shield the keyboard frame 21, so that a user cannot observe an interior of the keyboard frame 21 through a gap between a button switch 20 and the first button accommodating hole 213, improving appearance aesthetics. In addition, if AB adhesive overflows to two sides of the transverse frame 211, the AB adhesive overflow may be attached to an edge of a lower surface of the transverse support rib 221, and does not overflow to an upper surface of the transverse support rib 221 along a side surface of the transverse support rib 221.

In another possible implementation, the width of the transverse support rib 221 may be the same as the width of the transverse frame 211, and the width of the longitudinal support rib 222 may be the same as the width of the longitudinal frame 212. In this case, an area of the first button accommodating hole 213 is equal to an area of a second button accommodating hole 223. This facilitates processing, facilitates locating the keyboard frame 21 and the mechanical part 22 during press-fitting, greatly reduces a possibility of press-fitting deviation, and improves assembly precision of the keyboard frame 21 and the mechanical part 22.

In the foregoing embodiment of this application, the longitudinal frame 212 is used as a support, and the gap between the transverse frame 211 and the mechanical part 22 is used as the adhesive-accommodating structure. This uses a feature that the button switch 20 of the keyboard 200 is arranged in a staggered manner in a column direction. The transverse frame 211 continuously extends, and directly connects a left frame and a right frame of the outer frame 210 that are opposite to each other. AB adhesive located in the gap between the transverse frame 211 and the mechanical part 22 is in a connected state in a length direction. Therefore, the AB adhesive with specific flowability can be distributed more evenly in the adhesive-accommodating structure. This can reduce the risk of adhesive overflow to some extent. In addition, during dispensing adhesive on the transverse support rib 221, a dispensing mechanism continuously dispenses the adhesive in one direction. This helps improve dispensing efficiency and dispensing uniformity.

In addition, in addition to a support function, the longitudinal frame 212 may further perform a locating function.

When the keyboard frame 21 and the mechanical part 22 are press-fitted, a plurality of sections of longitudinal frames 212 are aligned with the longitudinal support rib 222 before press-fitting. This helps improve alignment precision of the keyboard frame 21 and the mechanical part 22, and avoids a phenomenon such as adhesive overflow, low assembly precision, and button switch clamping caused by press-fitting deviation.

For the keyboard frame 21 provided in the foregoing embodiment, in some other embodiments, the transverse frame 211 may alternatively protrude relative to the longitudinal frame 212 and the outer frame 210, so that the transverse frame 211 is closely attached to the mechanical part 22 as a support, and a gap between the longitudinal frame 212 and the mechanical part 22 forms an adhesive-accommodating structure. Alternatively, some transverse frames 211 and/or some longitudinal frames 212 may protrude relative to the outer frame 210, so that a protrusion is closely attached to the mechanical part 22 as a support, and a gap between the mechanical part 22 and a transverse frame or a longitudinal frame or both that are aligned with the outer frame 210 forms an adhesive-accommodating structure. The two solutions can also increase adhesive-accommodating gap, improve adhesion strength, and reduce a risk of adhesive overflow.

In some other possible embodiments, the keyboard frame 21 may alternatively be of another structure. For example, transverse frames 211 are arranged in a staggered manner in a row direction, and longitudinal frames 212 are arranged in a staggered manner in the column direction. That is, both the transverse frames 211 and the longitudinal frames 212 are discontinuously disposed. Alternatively, transverse frames 211 are arranged in a staggered manner in a row direction, and longitudinal frames 212 are arranged in an aligned manner in the column direction. That is, the transverse frames 211 are discontinuously disposed, and the longitudinal frames 212 are continuously disposed. Alternatively, transverse frames 211 are aligned in a row direction, and longitudinal frames 212 are aligned in the column direction.

In some other possible embodiments, it is not difficult to understand that surfaces on two sides of the keyboard frame 21 may be aligned, and a mismatch may be set between the transverse support rib 221 and the longitudinal support rib 222 of the mechanical part 22, so that the mismatch between the transverse support rib 221 and the longitudinal support rib 222 is used as an adhesive-accommodating structure.

The keyboard 200 provided in this embodiment of this application may be applied to the notebook computer 100 shown in FIG. 1. In this case, the mechanical part 22 may be used as an upper surface of a second body 12 of the notebook computer 100. The keyboard frame 21 is attached to a lower surface of the mechanical part 22, and may further be fastened to the second body 12 through hot melting, screw locking, or the like. The keyboard 200 uses the mismatch between the transverse frame 211 and the longitudinal frame 212 of the keyboard frame 21 as the special adhesive-accommodating structure. Therefore, this can reduce a risk of adhesive overflow, reduce an adhesive removal difficulty, reduce manpower for adhesive removal, reduce overall production costs of the notebook computer 100, and improve production efficiency.

In addition to being applied to the notebook computer 100, the keyboard 200 provided in this embodiment of this application may be applied to another electronic device, such as a tablet computer, a desktop computer, a virtual reality device, or a vehicle-mounted apparatus. When the keyboard 200 is applied to the another electronic device, the keyboard 200 may be an independent keyboard or integrated into the electronic device. In this case, a mechanical part 22 of the keyboard 200 may be directly used as a shell of the keyboard or a shell of the electronic device. A specific structure of the keyboard 200 may also have another variant. For example, an arrangement manner of button switches 20 may be that the button switches are aligned transversely and longitudinally, or the button switches are arranged transversely and longitudinally in a staggered manner. However, a solution in which the mismatch between the transverse frame and the longitudinal frame of the keyboard frame 21 is used as the adhesive-accommodating structure should fall within the protection scope of this application.

It should be understood that, the solution provided in this embodiment of this application that uses the mismatch between the transverse frame and the longitudinal frame as the adhesive-accommodating structure is applicable to adhesion of a narrow-edge structure, for example, adhesion of a narrow-edge structure whose width is less than 2 mm. A solution using a conventional adhesive overflow groove or adhesive blocking wall in a related art is limited by a narrow side, adhesion reliability is relatively poor, and a risk of adhesive overflow is still relatively high. Using the mismatch as the special adhesive-accommodating structure, as analyzed above, has a good effect of increasing an adhesive amount and avoids the risk of adhesive overflow, and is suitable for adhesion between narrow-edge structures. If the solution in which the mismatch between the transverse narrow side and the longitudinal narrow side is used as the adhesive-sealing structure is applied to an apparatus such as a backlight module having lamp beads arranged in an array, or a telephone having buttons arranged in an array, it may be considered as a simple modification based on the technical solution recorded in embodiments of this application.

Finally, it should be noted that the foregoing embodiments are merely intended for describing the technical solutions of embodiments of this application other than limiting embodiments of this application. Although embodiments of this application are described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A keyboard, comprising:
   a button switch;
   a keyboard frame; and
   a mechanical part connected to the keyboard frame by an adhesive, wherein:
   the keyboard frame comprises a transverse frame and a longitudinal frame, the transverse frame extends in a row direction, the longitudinal frame extends in a column direction and is connected between two adjacent transverse frames, a plurality of longitudinal frames are arranged in a staggered manner in the column direction, and the transverse frame and the longitudinal frame cross to form a first button accommodating hole;
   the mechanical part comprises a transverse support rib and a longitudinal support rib, the transverse support rib and the longitudinal support rib cross to form a second button accommodating hole, and the first button accommodating hole and the second button accommodating hole are aligned and accommodate the button switch; and the longitudinal frame protrudes relative to the transverse frame on a side of the keyboard frame connected to the mechanical part, the longitudinal frame abuts and is attached to the transverse support rib, and a first adhesive-accommodating gap is between the transverse frame and the transverse support rib.

2. The keyboard according to claim 1, wherein the keyboard frame further comprises an outer frame, the transverse frame and the longitudinal frame are connected in the outer frame, wherein the mechanical part further comprises an outer support rib, the transverse support rib and the longitudinal support rib are connected in the outer support rib, the longitudinal frame protrudes relative to the outer frame on the side of the keyboard frame connected to the mechanical part, and a second adhesive-accommodating gap is between the outer frame and the outer support rib.

3. The keyboard according to claim 1, wherein an end face of a protrusion of the longitudinal frame is aligned with an edge of the transverse frame, and surfaces of the transverse frame that form the first adhesive-accommodating gap are on a same plane and have a same width.

4. The keyboard according to claim 3, wherein a height of the protrusion of the longitudinal frame is in a range from 0.05 mm to 0.15 mm.

5. The keyboard according to claim 1, wherein a width of the transverse support rib is greater than a width of the transverse frame, and a width of the longitudinal support rib is greater than a width of the longitudinal frame.

6. The keyboard according to claim 1, wherein the transverse frame and the longitudinal frame have a same width.

7. The keyboard according to claim 6, wherein the width of the transverse frame and the longitudinal frame is in a range from 1 mm to 1.5 mm.

8. The keyboard according to claim 1, wherein the keyboard frame is made of plastic, and the mechanical part is made of metal.

9. An electronic device, comprising:
a keyboard, wherein the keyboard comprises: a button switch, and a keyboard frame and a mechanical part connected by an adhesive, wherein the keyboard frame comprises a transverse frame and a longitudinal frame, the transverse frame extends in a row direction, the longitudinal frame extends in a column direction and is connected between two adjacent transverse frames, a plurality of longitudinal frames are arranged in a staggered manner in the column direction, and the transverse frame and the longitudinal frame cross to form a first button accommodating hole; and the mechanical part comprises a transverse support rib and a longitudinal support rib, the transverse support rib and the longitudinal support rib cross to form a second button accommodating hole, and the first button accommodating hole and the second button accommodating hole are aligned and accommodate the button switch; and the longitudinal frame protrudes relative to the transverse frame on a side of the keyboard frame that is connected to the mechanical part, the longitudinal frame abuts and is attached to the transverse support rib, and a first adhesive-accommodating gap is between the transverse frame and the transverse support rib.

10. The keyboard according to claim 9, wherein the keyboard frame further comprises an outer frame, the transverse frame and the longitudinal frame are connected in the outer frame, the mechanical part further comprises an outer support rib, the transverse support rib and the longitudinal support rib are connected in the outer support rib, the longitudinal frame protrudes relative to the outer frame on the side of the keyboard frame that is connected to the mechanical part, and a second adhesive-accommodating gap is formed between the outer frame and the outer support rib.

11. The keyboard according to claim 9, wherein an end face of a protrusion of the longitudinal frame relative to the transverse frame is aligned with an edge of the transverse frame, and surfaces of the transverse frame that are used to construct the first adhesive-accommodating gap are on a same plane and have a same width.

12. The keyboard according to claim 11, wherein a height of the protrusion of the longitudinal frame relative to the transverse frame is in a range from 0.05 mm to 0.15 mm.

13. The keyboard according to claim 9, wherein a width of the transverse support rib is greater than a width of the transverse frame, and a width of the longitudinal support rib is greater than a width of the longitudinal frame.

14. The keyboard according to claim 9, wherein the transverse frame and the longitudinal frame have a same width.

15. The keyboard according to claim 14, wherein the width of the transverse frame and the longitudinal frame is in a range from 1 mm to 1.5 mm.

16. The keyboard according to claim 9, wherein the keyboard frame is a plastic part, and the mechanical part is a metal part.

17. The electronic device according to claim 9, wherein the electronic device is a notebook computer, the notebook computer comprises a first body and a second body connected by a rotating shaft, a display is disposed on the first body, the keyboard and a touchpad are disposed on the second body, and a mechanical part of the keyboard is a shell that is of the second body and that faces the first body.

18. A computer, comprising:
a first body comprising a display; and
a second body connected to the first body by a rotating shaft, the second body comprising:
a touchpad; and
a keyboard comprising:
a button switch;
a keyboard frame; and
a mechanical part connected to the keyboard frame by an adhesive, wherein:
the keyboard frame comprises a transverse frame and a longitudinal frame, the transverse frame extends in a row direction, the longitudinal frame extends in a column direction and is connected between two adjacent transverse frames, a plurality of longitudinal frames are arranged in a staggered manner in the column direction, and the transverse frame and the longitudinal frame cross to form a first button accommodating hole;
the mechanical part comprises a transverse support rib and a longitudinal support rib, the transverse support rib and the longitudinal support rib cross to form a second button accommodating hole, and the first button accommodating hole and the second button accommodating hole are aligned and accommodate the button switch, the mechanical part of the keyboard is a shell that is of the second body and that faces the first body; and
the longitudinal frame protrudes relative to the transverse frame on a side of the keyboard frame connected to the mechanical part, the longitudinal frame abuts and is attached to the transverse support rib, and a first adhesive-accommodating gap is between the transverse frame and the transverse support rib.

19. The computer according to claim 18, wherein the keyboard frame further comprises an outer frame, the transverse frame and the longitudinal frame are connected in the outer frame, wherein the mechanical part further comprises an outer support rib, the transverse support rib and the longitudinal support rib are connected in the outer support rib, the longitudinal frame protrudes relative to the outer frame on the side of the keyboard frame connected to the mechanical part, and a second adhesive-accommodating gap is between the outer frame and the outer support rib.

20. The computer according to claim 1, wherein an end face of a protrusion of the longitudinal frame is aligned with an edge of the transverse frame, and surfaces of the transverse frame that form the first adhesive-accommodating gap are on a same plane and have a same width.

* * * * *